(12) United States Patent
Gellin

(10) Patent No.: US 9,858,047 B2
(45) Date of Patent: *Jan. 2, 2018

(54) GENERATING COMPREHENSIVE SYMBOL TABLES FOR SOURCE CODE FILES

(71) Applicant: International Business Machines Corporation, Armonk, NY (US)

(72) Inventor: Jonathan C. Gellin, Dunwoody, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/387,720

(22) Filed: Dec. 22, 2016

(65) Prior Publication Data
US 2017/0109143 A1   Apr. 20, 2017

Related U.S. Application Data

(63) Continuation of application No. 14/882,730, filed on Oct. 14, 2015, now Pat. No. 9,672,030.

(51) Int. Cl.
*G06F 9/45* (2006.01)
*G06F 9/44* (2006.01)

(52) U.S. Cl.
CPC . *G06F 8/34* (2013.01); *G06F 8/71* (2013.01)

(58) Field of Classification Search
CPC ............... G06F 8/71; G06F 8/443; G06F 8/34
See application file for complete search history.

(56) References Cited

U.S. PATENT DOCUMENTS

| | | | |
|---|---|---|---|
| 5,287,511 A | 2/1994 | Robinson et al. | |
| 5,860,004 A | 1/1999 | Fowlow et al. | |
| 6,298,479 B1 | 10/2001 | Chessin et al. | |
| 6,305,008 B1 | 10/2001 | Vaidyanathan et al. | |

(Continued)

FOREIGN PATENT DOCUMENTS

CN    104156314 A    11/2014

OTHER PUBLICATIONS

IBM®, "Family of IBM Rational Integrated Development Environments V9.5 delivers significant new capabilities and adopts a new Eclipse level", IBM United State Software Announcement 215-380, dated Sep. 1, 2015, pp. 1-14, Evidence of Grace Period Use or Sale.

(Continued)

*Primary Examiner* — Chameli Das
(74) *Attorney, Agent, or Firm* — Gilbert Harmon, Jr.

(57) ABSTRACT

A computer system product includes instructions to identify a primary symbol table associated with a primary source code file and identify a secondary symbol table associated with a secondary source code file. The computer system product includes instructions to receive a source code association indication. The source code association indication includes at least one association relationship between the primary source code file and the secondary source code file. The computer system product includes instructions to create a comprehensive symbol table. The comprehensive symbol table comprises contents of the primary symbol table and contents of the secondary symbol table. A corresponding computer-implemented method and computer system are also disclosed.

1 Claim, 5 Drawing Sheets

(56) References Cited

U.S. PATENT DOCUMENTS

| | | | |
|---|---|---|---|
| 6,367,068 B1 | 4/2002 | Vaidyanathan et al. | |
| 6,467,605 B1 | 10/2002 | Head, III | |
| 7,240,338 B1 * | 7/2007 | Bell | G06F 8/51 |
| | | | 717/137 |
| 7,818,729 B1 | 10/2010 | Plum et al. | |
| 7,865,870 B2 | 1/2011 | Gunturi et al. | |
| 8,375,356 B2 | 2/2013 | Rathbone et al. | |
| 8,578,356 B1 * | 11/2013 | Pritchard | G06F 17/5054 |
| | | | 711/154 |
| 8,769,517 B2 | 7/2014 | Baker et al. | |
| 9,389,837 B1 | 7/2016 | Gellin | |
| 9,513,877 B1 | 12/2016 | Gellin | |
| 2002/0032901 A1 | 3/2002 | Chessin | |
| 2003/0177420 A1 | 9/2003 | Baker et al. | |
| 2006/0143222 A1 | 6/2006 | Daniel | |
| 2007/0055966 A1 | 3/2007 | Waddington et al. | |
| 2007/0174490 A1 | 7/2007 | Choi et al. | |
| 2007/0195894 A1 | 8/2007 | Shokrollahi et al. | |
| 2008/0091938 A1 | 4/2008 | Pedersen et al. | |
| 2009/0007065 A1 * | 1/2009 | Becker | G06F 8/443 |
| | | | 717/110 |
| 2010/0275189 A1 * | 10/2010 | Cooke | G06F 8/456 |
| | | | 717/146 |
| 2011/0167404 A1 | 7/2011 | Liu et al. | |
| 2011/0219357 A1 | 9/2011 | Livshits et al. | |
| 2012/0174061 A1 | 7/2012 | McCollum et al. | |
| 2012/0192096 A1 | 7/2012 | Bowman et al. | |
| 2012/0198419 A1 | 8/2012 | Neill et al. | |
| 2012/0291010 A1 | 11/2012 | Hutchison et al. | |
| 2013/0007700 A1 | 1/2013 | Villar et al. | |
| 2015/0135166 A1 | 5/2015 | Tarlow et al. | |

OTHER PUBLICATIONS

IBM®, "IBM Rational Developer for z Systems HLL/WB Editition V9.5 delivers enhanced customer value", IBM United State Software Announcement 215-424, dated Sep. 15, 2015, pp. 1-8, Evidence of Grace Period Use or Sale.

"Code Autocompletion", Cloud 9, printed on Sep. 2, 2015, 3 pages, ,https://docs.c9.io/docs/autocompletion>.

Gellin, Jonathan C. "Generating Comprehensive Symbol Tables for Source Code Files", U.S. Appl. No. 14/882,730, filed Oct. 14, 2015, 26 pages.

IBM, List of IBM Patents or Patent Applications Treated as Related, Appendix P, Dec. 21, 2015, 2 pages.

* cited by examiner

```
1. /* File Name: PROGRAM.PLI */

2. PROGRAM: PROC OPTIONS(MAIN)

3. DCL S1 CHAR(5) INIT('Hello');

4. DCL S2 CHAR(5) INIT('World');

5. %INCLUDE HEADER.INC

6. END PROGRAM;
```

300

```
1. /* File Name: HEADER.INC */

2. DCL S CHAR(10);

3. S = S1 || _
```

301

S —— 360
S1 —— 361
S2 —— 362

350

GENERATING COMPREHENSIVE SYMBOL TABLES FOR SOURCE CODE FILES

BACKGROUND

The present invention relates generally to the field of code-editing user interfaces, and more particularly to generating symbol tables for source code files.

Symbol tables generated based on one or more source code files can serve to enhance the quality and convenience of user experience in code-editing user interfaces. Users of code-editing user interfaces continue to face difficulties with some inadequate features of those software platforms that result from inefficient techniques of generating symbol tables used by those software platforms.

SUMMARY

A computer system for generating comprehensive symbol tables to improve programing performance. The computer system includes one or more computer readable storage media, and program instructions stored on the one or more computer readable storage media. The computer system includes instructions to identify and generate a primary symbol table associated with a primary header source code file and identify a secondary symbol table associated with a secondary PL/I source code file. Subsequent being loaded, the computer system includes instructions to parse the primary source file and the secondary source file. The computer system further includes instructions to receive a source code association indication. The source code association indication includes at least one association relationship between the header source code file and the secondary source code file. The computer system further includes instructions to create a comprehensive symbol table. The comprehensive symbol table comprises contents of the primary symbol table and contents of the secondary symbol table. The computer system further includes instructions to retrieve the comprehensive symbol table and retrieve one or more user source code textual inputs from one or more users. The one or more user source code textual inputs are associated with the primary header source code file. The computer system further includes instructions to determine zero or more auto-completion suggestions based on the one or more user source code textual inputs and the comprehensive symbol table. The computer system further includes instructions to display the zero or more auto-completion suggestions to the one or more users in the context of at least one instance of the primary header source code file. A corresponding computer-implemented method and computer system are also disclosed.

DETAILED DESCRIPTION

Figure 1:
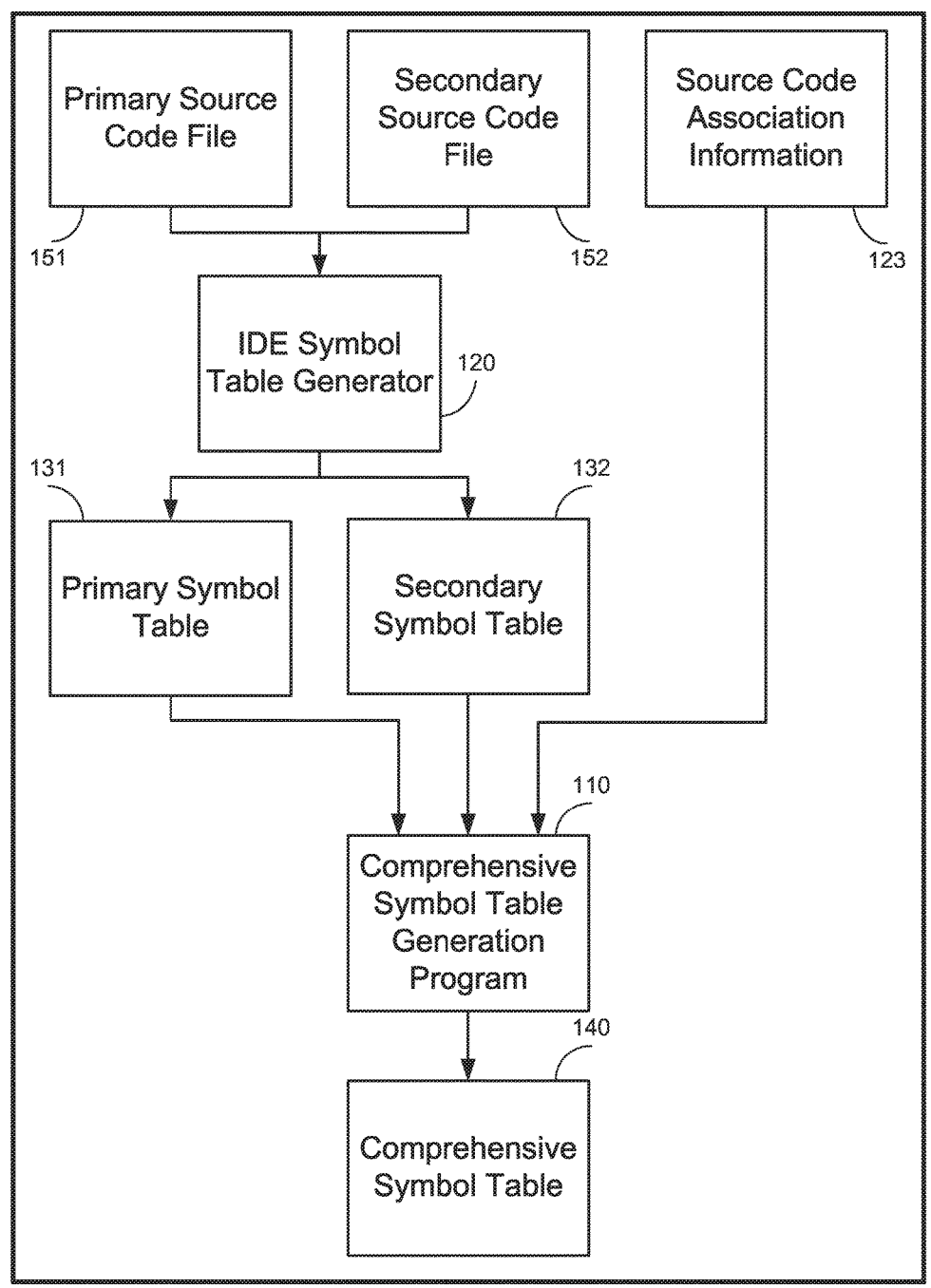
FIG. 1 is a block diagram of one embodiment of a computer system environment suitable for operation of a comprehensive symbol table generation program, in accordance with at least one embodiment of the present invention.

FIG. 1 is a block diagram of one embodiment of a computer system environment suitable for operation of a comprehensive symbol table generation program 110, in accordance with at least one embodiment of the present invention. In the computer system depicted in FIG. 1, an IDE symbol table generator 120 is a component of a code-editing user interface (also known as an integrated development environment, or an IDE) responsible for generating one or more symbol tables based on one or more source code files. The IDE symbol table generator 120 uses the primary source code file 151 to generate a primary symbol table 131, and a secondary source code file 152 to generate a secondary symbol table 132.

In some embodiments, the IDE symbol table generator 120 periodically monitors (e.g. loads and parses) the contents of one or more source code files (such as the primary source code file 151 and the secondary source code file 152) to generate one or more symbol tables (such as the primary symbol table 131 and the secondary symbol table 132). In at least some embodiments, a symbol table generated based on a source code file comprises zero or more source code symbols (e.g. variable names, function/subroutine/method names, data types, etc.) used, declared, defined, initialized, and/or assigned to in the source code file.

In the computing environment depicted in FIG. 1, the comprehensive symbol table generation program 110 uses the primary symbol table 131, the secondary symbol table 132, and information 123 about one or more association relationships between the primary source code file 151 and the secondary source code file 152 (i.e. the "source code association information" 123) to create a comprehensive symbol table 140. In at least some embodiments, the comprehensive symbol table comprises any source code symbols in the primary source code file 151 and any source code symbols in the secondary source code file 152.

Figure 2:
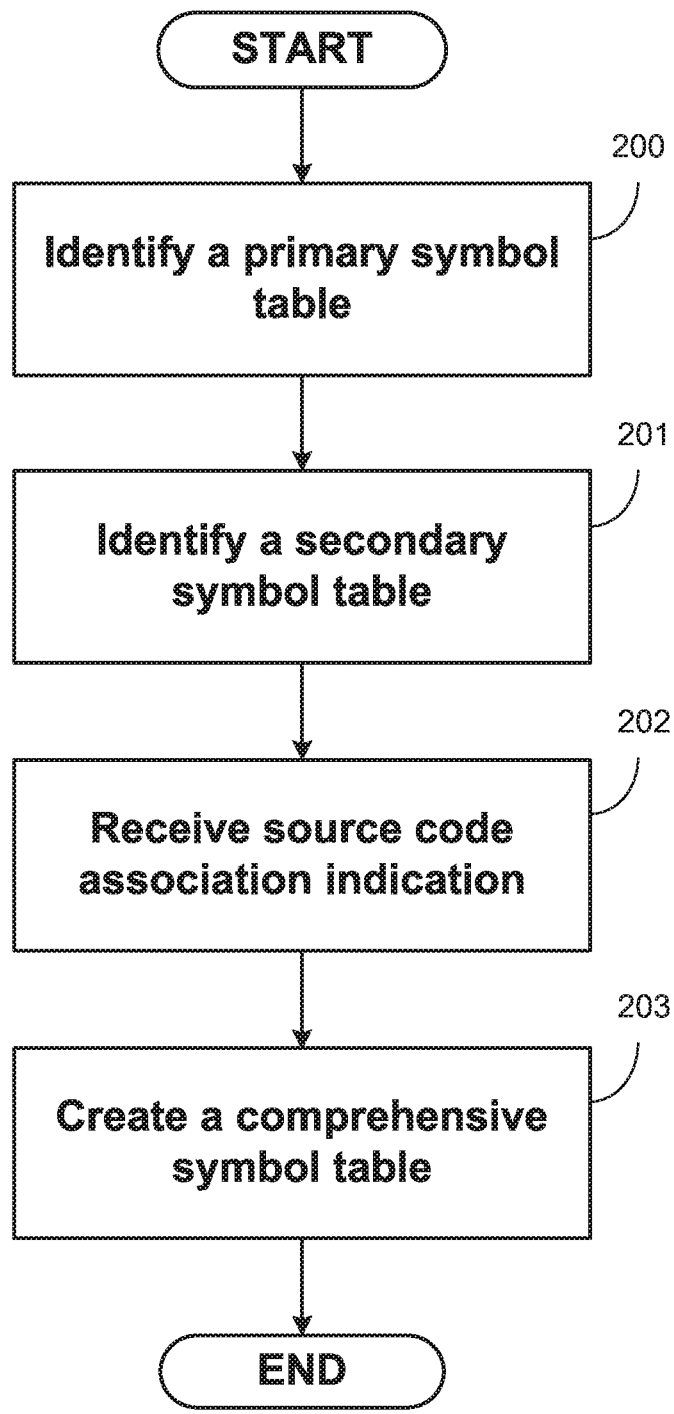
FIG. 2 is a flowchart diagram of a comprehensive symbol table generation program, in accordance with at least one embodiment of the present invention.

FIG. 2 is a flow-chart diagram of a comprehensive symbol table generation program, in accordance with at least one embodiment of the present invention. At step 200, the program identifies a primary symbol table associated with a primary source code file. At step 201, the program identifies a secondary symbol table associated with a secondary source code file. At step 202, the program receives a source code association indication, where the source code association indication denotes at least one association relationship between the primary source code file and the secondary source code file. At step 203, the program creates a comprehensive symbol table comprising contents of the primary symbol table and contents of the secondary symbol table.

In some embodiments, the primary source code file is a header source code file. A header source code file is any source code file whose contents will, during regular execution of a source code program, be in whole or in part inserted into one or more other files. In at least some embodiments, the insertion of the header source code file contents into one or more other files is requested by the programmer using one or more include indications, such as one or more include directives (e.g. the #include directive in C and C++, the COPY directive in COBOL, the % include directive in PL/I, the <!--#include . . . --> directive in HTML SSI, and the <%@ include . . . %> directive in JSP). In some embodiments, the header source code file comprises source code definitions and/or source code declarations of one or more functions/subroutines/methods and/or one or more data variables (including one or more class instances and/or objects).

In some embodiments, the comprehensive symbol generation program receives one or more user source code textual inputs from one or more users, where the one or more user source code textual inputs are associated with the header source code file. The program further determines zero or more auto-completion suggestions based on the one or more user source code textual inputs and the comprehensive symbol table. In some of those embodiments, the program further displays the zero or more auto-completion suggestions to the one or more users in the context of at least one instance of the header source code file (e.g. in at least one page in which the header source code file is being edited, for instance using an IDE). In at least some of those embodiments, the program uses the comprehensive symbol table to generate auto-completion suggestions that facilitate the creation and/or editing of the header source code file. In some embodiments, determining the zero or more auto-completion suggestions comprises retrieving the comprehensive symbol table. In some embodiments, the program displays the zero or more auto-completion suggestions to the one or more users in the context of the primary source code file. In some embodiments, the program displays the zero or more auto-completion suggestions to the one or more users in the context of the header source code file. In at least some embodiments, retrieving a symbol table comprises querying the symbol table.

Figure 3:
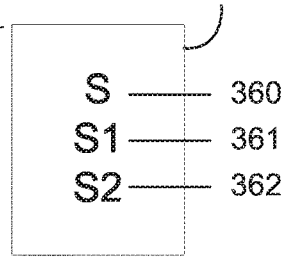
FIG. 3 is an operational example of a comprehensive symbol table generation program, in accordance with at least one embodiment of the present invention.

FIG. 3 is an operational example of a comprehensive symbol table generation program, in accordance with at least one embodiment of the present invention. In the embodiment depicted in FIG. 3, the PL/I source code file PROGRAM.PLI 300 and the PL/I source code file HEADER.INC 301 are associated through at least one association relationship, and the indication of that association (e.g. caused to be made by the programmer) has been received by the program. The source code file PROGRAM.PLI 300 declares and initializes the symbol S1, which is an array of characters (i.e. functionally, a string) of size 5, on line 3; and declares and initializes the symbol S2, which is also an array of characters of size 5, on line 4. The source code file HEADER.INC 301 declares the symbol S, which is an array of characters of size 10, on line 2.

In the embodiment depicted in FIG. 3, when the programmer uses the II operator, which in PL/I can take a character array on its right-hand side, the comprehensive symbol table generation program determines three auto-completion suggestions 350 for the entry on the right hand side of that operator: the S1 361 and S2 362 symbols (both denoting character array variables) from the associated source code file PROGRAM.PLI 300; and the S symbol 360 (denoting a character array variable) from the source code file HEADER.INC 301 itself.

Figure 4A:
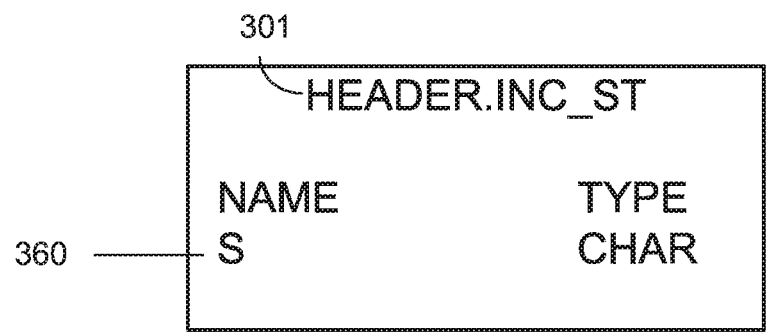
FIGS. 4A, 4B, and 4C are an operational examples of symbol tables, in accordance with at least one embodiment of the present invention.
Figure 4B:
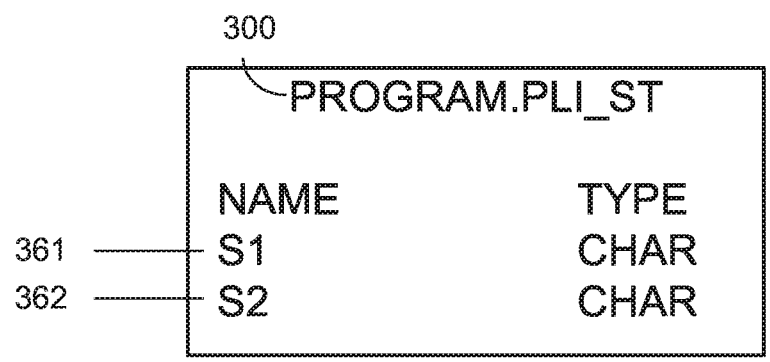
Figure 4C:
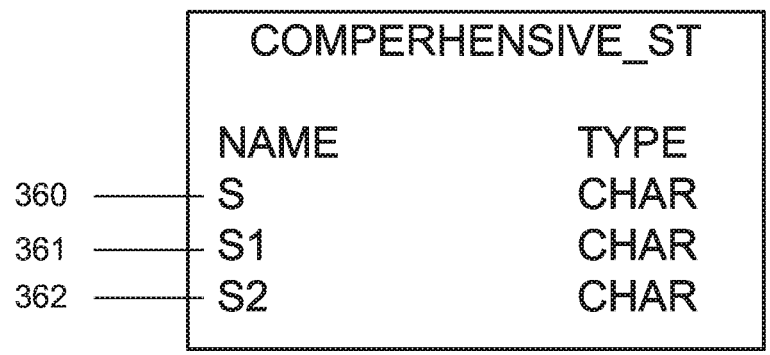

FIGS. 4A, 4B, and 4C depict operational examples of symbol tables, in accordance with at least one embodiment of the present invention. The symbol table depicted in FIG. 4A is associated with the source code file HEADER.INC 301, and comprises the symbol S 360. The symbol table in FIG. 4B is associated with the source code file PROGRAM.PLI 300 and comprises the symbol S1 361 and symbol S2 362.

The symbol table in FIG. 4C is a comprehensive symbol table produced by the symbol table generation program. The comprehensive symbol table in FIG. 4C comprises the contents (e.g. symbols) of both the symbol table in FIG. 4A (i.e. the symbol S 360) and the symbol table in FIG. 4B (i.e. the symbol S1 361 and the symbol S2 362). In some embodiments, the comprehensive symbol table generation program uses a comprehensive symbol table (such as the symbol table in FIG. 4C) to generate zero or more auto-completion suggestions in the context of a header source code file (such as the source code file HEADER.INC 301) based on one or more source code textual inputs from one or more users (such as the insertion of the || operator in the PL/I source code file HEADER.INC 301).

The comprehensive symbol table generation program identifies a primary symbol table at step 200 and a secondary symbol table at step 201. In some embodiments, the program identifies a primary symbol table and/or a secondary symbol table based on one or more pieces of information obtained directly or indirectly from one or more computer (hardware or software) components, and/or one or more pieces of information obtained directly or indirectly from one or more inputs from one or more users. In some embodiments, the program identifies a primary symbol table and/or a secondary symbol table by identifying a primary source code file and/or a secondary source code file. In some embodiments, the program constructs a primary symbol table and/or a secondary symbol table. In some embodiments, the program loads the primary source code file and parses the primary source code file (e.g. to create a primary symbol table). In some of those embodiments, the program further loads the secondary source code file and parses the secondary source code file (e.g. to create a secondary symbol table).

The comprehensive symbol table generation program receives a source code association indication at step 202. In some embodiments, the program receives a source code association indication by receiving one or more pieces of information obtained directly or indirectly from one or more computer (hardware or software) components, and/or one or more pieces of information obtained directly or indirectly from one or more inputs from one or more users. In some embodiments, the program receives a source code association indication by accessing one or more locations in a computer readable storage media. The possible forms of computer readable storage media comprise persistent storage components (such as the hard disks), main memory components, cache components, registers and other storage media components in the processing circuit, online storage components, and offline bulk storage components.

In some embodiments, the source code association indication comprises one or more instructions to least one application programming interface. In some embodiments, the source code association indication comprises one or more instructions to at least one user interface management software. In some embodiments, the source code association indication is caused to be made by one or more actions performed on and/or issued to a graphical user interface software platform. In some embodiments, the source code association indication may be based on one or more rules and/or conventions of one or more programming languages and/or one or more coding platforms. In some embodiments, the source code association indication comprises one or more input instructions selected from the group consisting of: (i) one or more instructions to least one application programming interface; and (ii) one or more instructions to at least one user interface management software. In some embodiments, the source code association indication may comprise a combination of two or more of the aforementioned information and/or user actions.

The source code association indication denotes at least one association relationship between a primary source code file and a secondary source code file. In some embodiments, an association relationship is any relationship that in whole or in part creates at least one point of intersection between one or more of the namespaces of one source code file and one or more of the namespaces of another source code file; or any relationship that in whole or in part causes at least one source code symbol to be potentially referenceable in at least two source code files. In some embodiments, an association relationship is any relationship that in whole or in part causes at least one source code symbol to be shared between at least one of the one or more symbol tables of one source code file and at least one of the one or more symbol tables of another source code file.

The comprehensive symbol table generation program creates a comprehensive symbol table at step 203. In some embodiments, the program generates and/or compiles the code for creating the comprehensive symbol table. In some embodiments, the program receives pre-generated and/or pre-compiled code for creating a comprehensive symbol table obtained directly or indirectly from one or more computer (hardware or software) components. In some embodiments, the program creates a comprehensive symbol table by receiving one or more pieces of information obtained directly or indirectly from one or more computer (hardware or software) components, and/or one or more pieces of information obtained directly or indirectly from one or more inputs from one or more users. In some embodiments, the program creates a comprehensive symbol table by creating a comprehensive source code file comprising the primary source code file and the secondary source code file and creating a symbol table for the comprehensive source code file (e.g. by loading and parsing the comprehensive source code file). In at least some embodiments, creating a symbol table for one or more source code files comprises determining zero or more source code symbols (and/or the syntactic and/or semantic properties of those symbols) based on the one or more source code files.

Generating comprehensive symbol tables based on customized, user-issued association indications in addition to static rules of source code association (e.g. rules based on one or more rules and/or conventions of one or more programming languages and/or one or more coding platforms) allow for more intelligent creation of comprehensive symbol tables that can facilitate programming and/or software development practice. In addition, generating comprehensive symbol tables based on customized, user-issued association indications introduces notions of dynamic binding into symbol table generation techniques and as such can increase the utility of symbol tables as tools of facilitating programming and/or software development practice. Nevertheless, the aforementioned advantages are not required to be present in all of the embodiments of the invention and may not be present in all of the embodiments of the invention.

Figure 5:
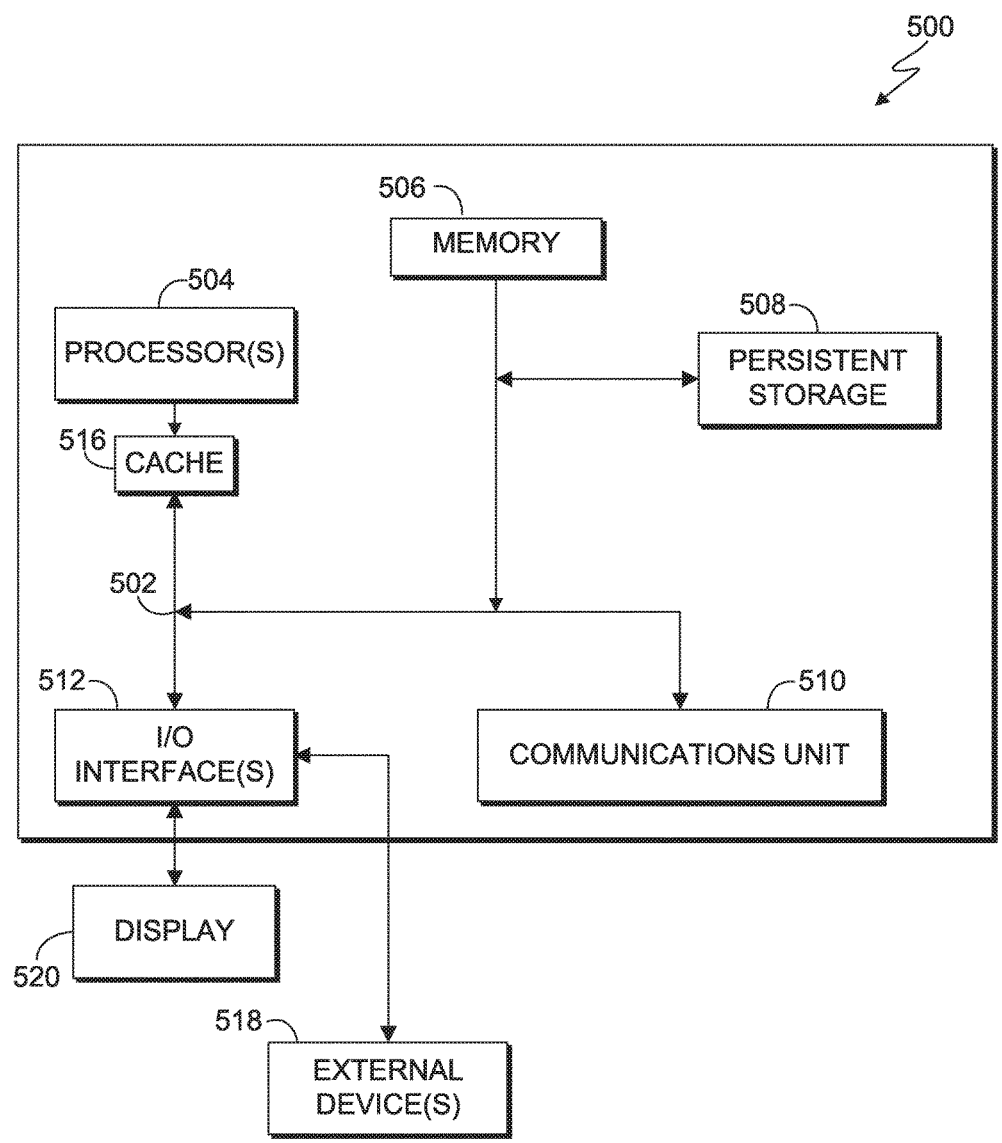
FIG. 5 is a block diagram of a computing apparatus suitable for executing a comprehensive symbol table generation program, in accordance with at least one embodiment of the present invention.

FIG. 5 is a block diagram depicting components of a computer 500 suitable for executing the comprehensive symbol table generation program. FIG. 5 displays the computer 500, the one or more processor(s) 504 (including one or more computer processors), the communications fabric 502, the memory 506, the RAM, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g. microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the comprehensive symbol table generation program may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The comprehensive symbol table generation program may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer system product at any possible technical detail level of integration. The computer system product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer system products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer system products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for generating comprehensive symbol tables to improve programing performance, the computer system comprising one or more computer readable storage media and program instructions stored on said one or more computer readable storage media, said computer system further comprising:

a processor;
one or more computer readable storage media;
computer system instructions;
said computer system instructions being stored on said one or more computer readable storage media; and
said computer system instructions comprising instructions to:
identify a primary symbol table;
load a primary source code file, wherein said primary symbol table is being associated with the primary source code file, wherein the primary source code is a header source code file;
parse said primary source code file;
identify a secondary symbol table;
load secondary source code file, wherein said secondary symbol table is being associated with a secondary source code file;
parse said secondary source code file;
receive a source code association indication, said source code association indication denoting at least one association relationship between said primary source code file and said secondary source code file;
create a comprehensive symbol table, said comprehensive symbol table comprising contents of said primary symbol table and contents of said secondary symbol table
receive one or more user source code textual inputs from one or more users, said one or more user source code textual inputs being associated with said header source code file;
generate one or more auto-completion suggestions through said comprehensive symbol table, wherein said one or more auto-completion suggestions facilitate at least one of creating or editing said primary source code file;
determine one or more auto-completion suggestions based on said one or more user source code textual inputs and said comprehensive symbol table, wherein said instructions to determine zero one or more auto-completion suggestions comprise instructions to retrieve said comprehensive symbol table; and
display said one or more auto-completion suggestions to said one or more users in the context of at least one instance of said header source code file.

* * * * *